United States Patent [19]

Shapiro

[11] Patent Number: 4,522,556
[45] Date of Patent: Jun. 11, 1985

[54] METHOD AND DEVICE FOR PACKAGING AND SHIPPING HIGH-LOFT BATTING

[75] Inventor: Sumner Shapiro, Albany, N.Y.

[73] Assignee: Star Textile Research, Inc., Albany, N.Y.

[21] Appl. No.: 427,549

[22] Filed: Sep. 29, 1982

[51] Int. Cl.³ .............................................. B65G 67/00
[52] U.S. Cl. ..................................... 414/786; 414/29; 414/400; 414/417
[58] Field of Search ............... 414/344, 345, 400, 417, 414/786; 141/65; 53/152, 153, 258, 260, 459, 247, 537, 572, 473

[56] References Cited

U.S. PATENT DOCUMENTS

| | | | |
|---|---|---|---|
| 1,253,997 | 1/1918 | Whitehurst et al. | 53/152 |
| 2,692,058 | 10/1954 | Straub | 414/417 X |
| 3,672,117 | 6/1972 | Shuttleworth et al. | 53/247 X |
| 3,748,797 | 7/1973 | Deines | 414/29 X |
| 4,247,245 | 1/1981 | Stolt et al. | 414/331 X |
| 4,337,804 | 7/1982 | Maruscak | 141/65 |

Primary Examiner—Joseph E. Valenza
Assistant Examiner—Stuart Millman
Attorney, Agent, or Firm—Kane, Dalsimer, Kane, Sullivan & Kurucz

[57] ABSTRACT

This invention pertains to a method and device for loading high-loft materials such as batting into the cargo compartment of a truck, container or railroad car. The high loft batting is rolled and packaged in plastic bags. The device has a number of tubular cells provided to hold said bags, and a support structure having a piston for each cell. The bags are inserted into the cells, and the device is then rolled into the truck. The bags are ejected from the cells by the pistons which push the bags out. The cells are arranged so that they form a shape which is similar to the cross-section of the cargo compartment. As the bags are ejected from the cell they maintain that shape thus insuring optimum loading of the compartment.

In order to reduce the volume of the bags, the bags are collapsed by removing some of the air contained within the bags prior to their insertion into the cells.

4 Claims, 12 Drawing Figures

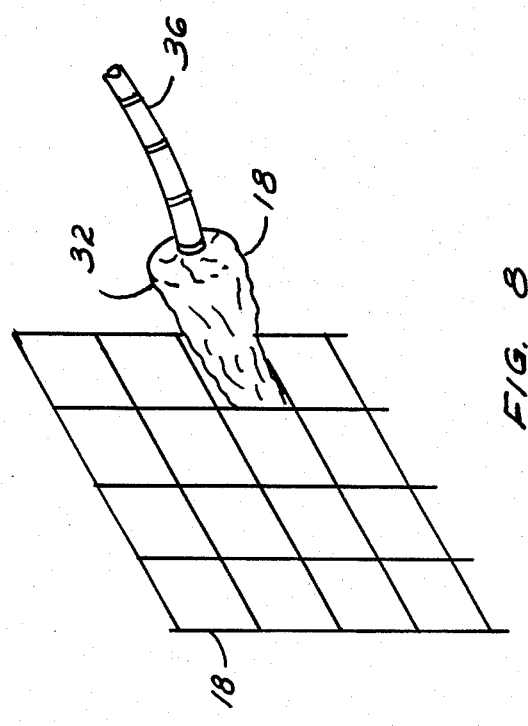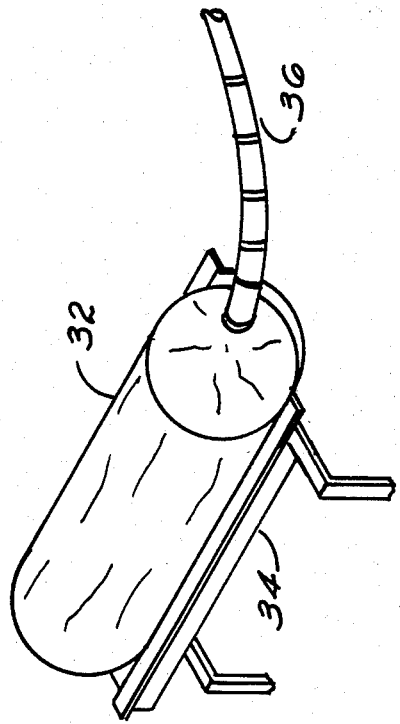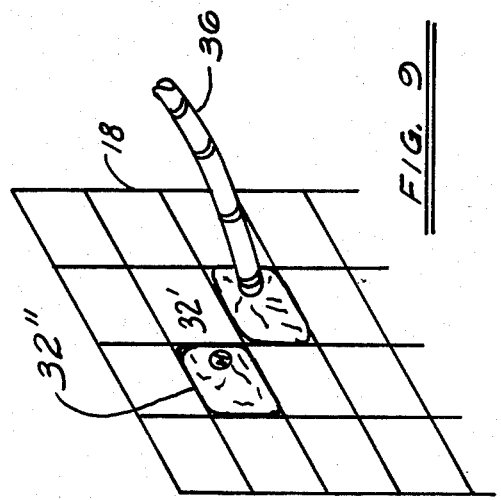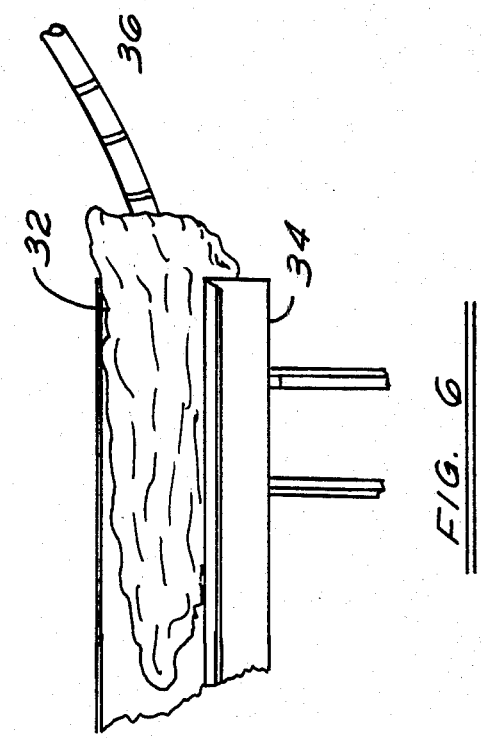

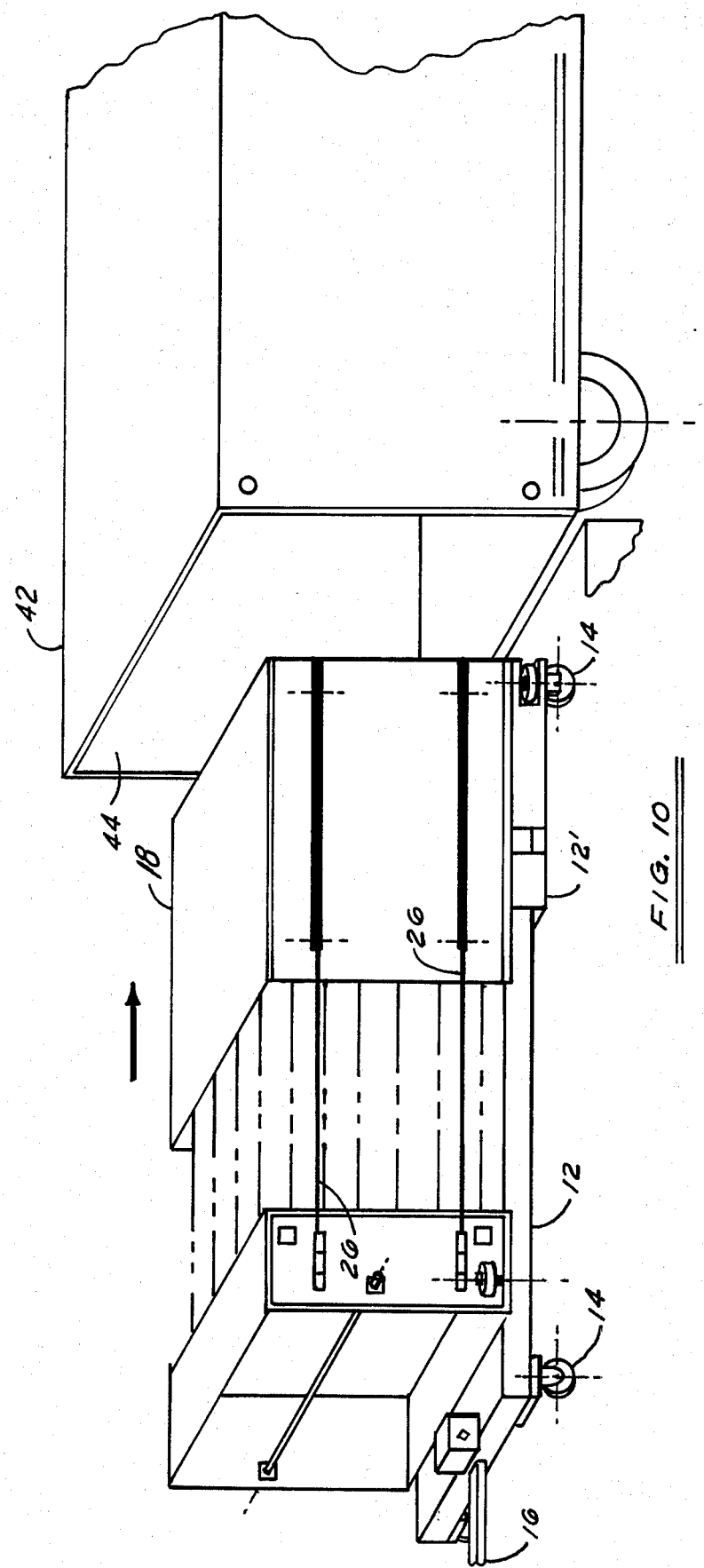

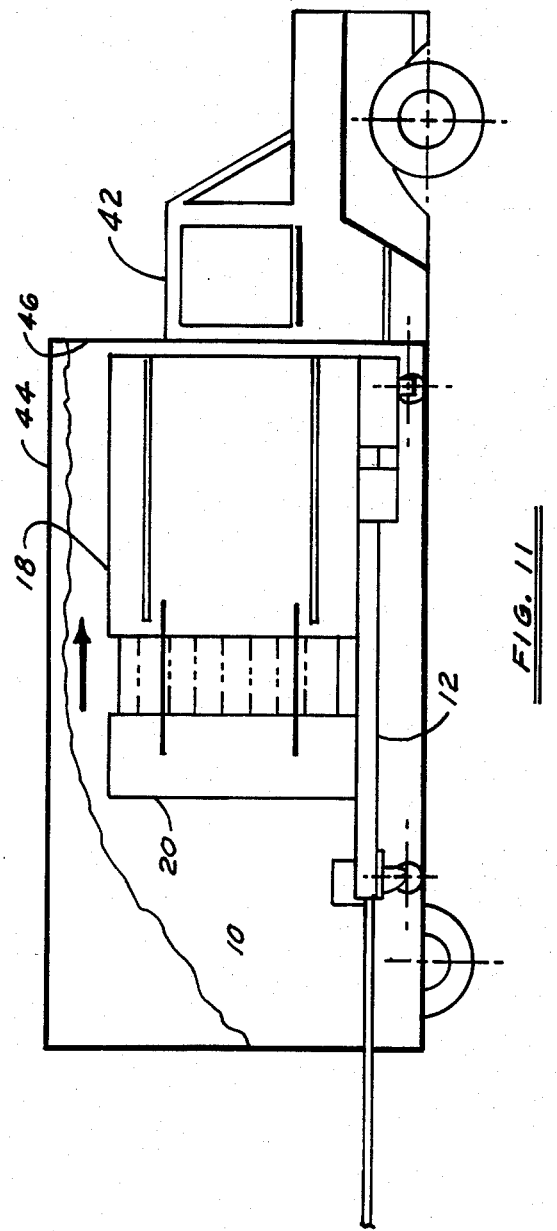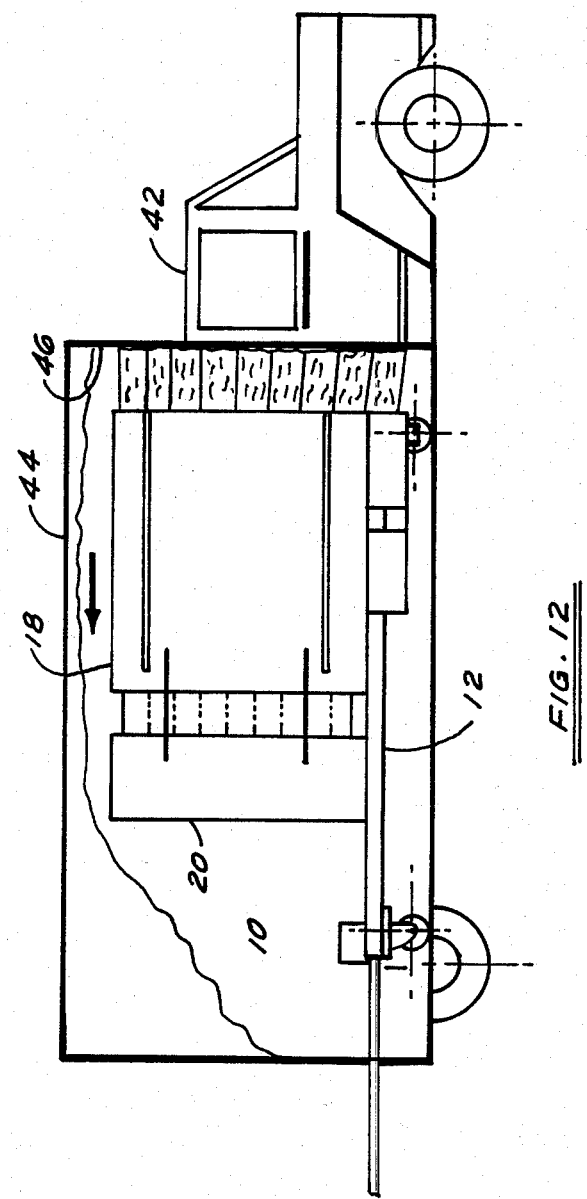

METHOD AND DEVICE FOR PACKAGING AND SHIPPING HIGH-LOFT BATTING

BACKGROUND OF THE INVENTION

This invention partains to a method and device for loading long, tubular objects on trucks or railroad cars, and, more particularly for loading compressable cylindrical packages such as high-loft batting.

The loading of long tubular objects on trucks or railroad cars has always been time consuming because each object had to be loaded individually. If these objects consisted of high-loft material such as batting the problem was compounded by the low weight-to-volume ratio of such material because this low ratio made handling and shipping of such objects very expensive. The problem is somewhat alleviated if high-loft batting is first rolled on a paper tube and then inserted in a plastic bag. In order to ship as much batting as possible, these bags are normally force-loaded into a truck by jamming them one on top of the other. This resulted in unequally compressed bags, the bags on top being intact and the bottom bags being mangled and having ripped or busted bags, and crushed or broken paper tubes.

OBJECTIVES AND SUMMARY OF THE INVENTION

Therefore an objective of this invention is to provide a fast method and device for loading the optimum number of long, tubular objects on a truck or container without damaging the bags.

A further objective is to provide a method of loading high-loft batting so that the batting is evenly distributed.

Yet another objective is to provide a faster method of loading said batting. Other objectives and advantages shall be described in the course of the preferred description.

According to this invention bags containing high-loft batting are loaded into a cargo compartment of a truck by placing them on a device having a number of tubular cells. The cells are arranged into the cross-sectional shape of the cargo compartment. When the device is placed in the cargo compartment and the bags are ejected from it, the bags retain their spatial relationships thus insuring optimal loading. Advantageously, some air is removed from the bags before they are placed in the cells to reduce their volume and thus increase the number of bags that can be loaded for shipping.

The device comprises a support frame, a plurality of cells disposed on the frame, and removing means adapted to eject the bags from the cells without changing their spatial relationship.

BRIEF DESCRIPTION OF THE DRAWINGS

FIG. 5 shows a bag of batting with a vacuum line attached to it;
FIG. 6 shows a bag of batting after some air has been removed;
FIG. 8 shows a bag being inserted into a cell;
FIG. 9 shows cells containing bags with batting;
FIG. 10 shows the device being moved into a cargo compartment of a truck;
FIG. 11 shows a cutaway view of the cargo compartment of the truck with device just before the bags are removed, and;
FIG. 12 shows the cutaway view of the cargo compartment while the bags are being removed from the device.

DESCRIPTION OF THE PREFERRED EMBODIMENT

Figure 1:
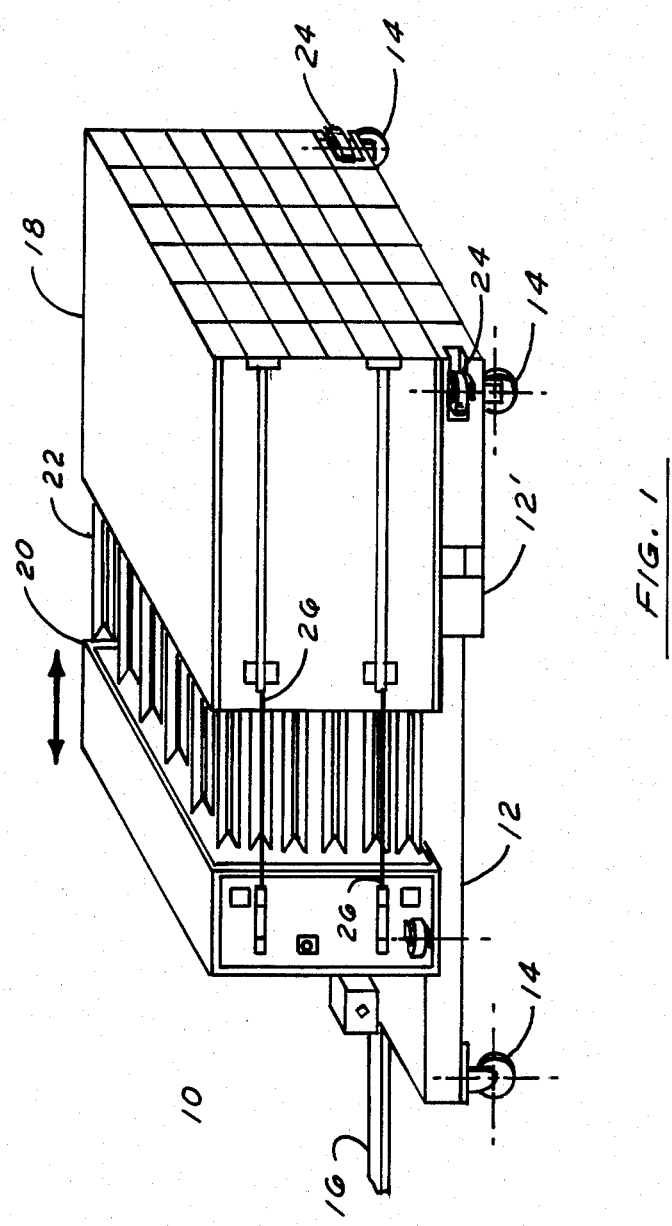
FIG. 1 is an isometric view of the device.
Figure 2:
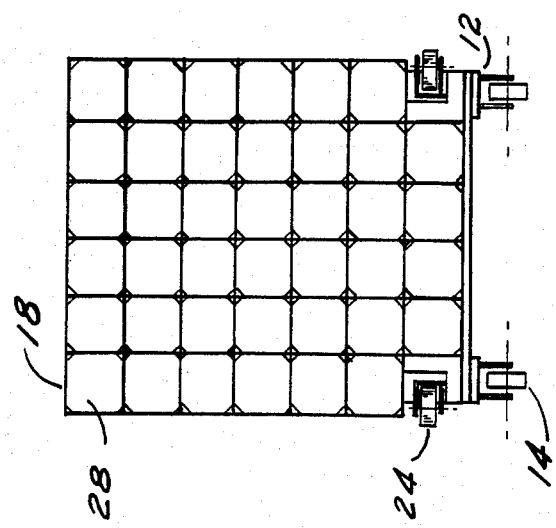
FIG. 2 shows the front view of the device.

As can be seen in FIGS. 1 and 2, the device 10 for loading articles into a truck or container, comprises a support frame 12 having a plurality of wheels 14 for moving the device with relative ease. Attached to the frame there is a handle 16 for maneuvering the device. A plurality of tubular cells 18 with two open ends are disposed on frame 12 and arranged like a honeycomb. Although all the cells presented herein are shown with a square or rectangular cross-section it is to be understood that the cross-section can have any shape suitable for holding the desired article. The cells extend lengthwise along the frame 12.

Also on the frame there is a support structure 20. The support structure is adapted to move from the rear end of the frame 12 to a position adjacent to the cells 18. Mounted on support structure there are a number of pistons 22, one for each cell. The pistons are adapted to move in and out of the cells preferably in unison as the support structure moves toward and away from the cell.

At its forward end 12' the frame also has two horizontal wheels 24.

The support structure and the cells are joined by connecting means 26. The purpose of the connecting means shall become clear during the description of the operation of the device.

Figure 4:
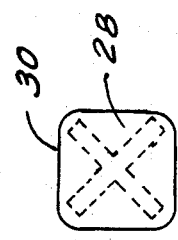
FIG. 4 shows a front view of the piston.
Figure 7:
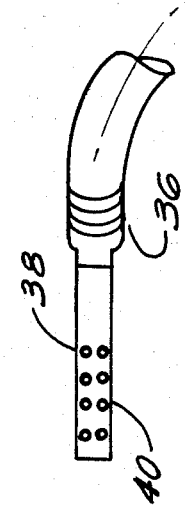
FIG. 7 shows the vacuum line head.
Figure 3:
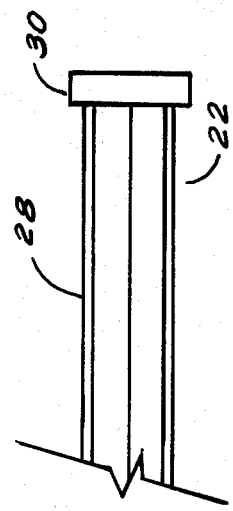
FIG. 3 shows a side view of the piston.

As can be best seen in FIGS. 3, and 4, piston 22 comprises a strut 28 and a piston head 30. The piston head has a roughly square shape to complement the cross section of a cell thus allowing the piston to move easily in and out of the cell.

High-loft batting is normally rolled on a paper tube and then inserted in a plastic bag. The bag then can be inserted into one of the cells for loading. In order to reduce the volume of the bag some of the air contained within the bag may be removed. As shown in FIGS. 5–9 a bag 32 containing high-loft batting is placed on supports 34. Then a vacuum line 36 is attached to the bag to remove some of the air contained therein. Preferably the vacuum line has a head 38 with a plurality of holes 40. Alternatively head 38 could comprise a cone or a funnel and a screen face. While the line 36 is attached to the bag 32, the head is disposed within two consecutive layers of the batting. As shown in FIG. 6, the removal of the air causes the bag to collapse. The bag, with the vacuum line still attached may then be inserted easily into one of the cells 18 as shown in FIG. 8. After the bag is in a cell, the operation is repeated with another bag, until all the cells 18 are filled. The removal of the vacuum line from the bags allows them to expand slightly to take the shape of the cell containing them. This can be seen in FIG. 9 where bag 32' is still attached to a line 36 while bag 32" is not.

Once all the cells are filled up with bags the device 10 is pushed in to the cargo compartment 44 of truck 42 shown in FIGS. 10–12. The device is stopped when it reaches the front end 46 of said compartment and the device is ready to be unloaded. At this point the distance between the cells and the support structure is gradually shortened by shortening the connecting means. For this purpose the connecting may comprise steel cables or chains which are pulled simultaneously by a winch disposed within the support structure. Since the support structure is restrained from moving toward the front of the truck by the bags, as the distance is shortened the cells move toward the support structure and the bags are ejected gradually from the cells as the cells slide over the bags and the pistons.

This operation is continued until all the bags have been removed from the cells and are contained within the cargo compartment. The cells are arranged to conform to the cross-sectional shape of the cargo compartment so that when the bags are displaced from the loading device they maintain the relative spatial relationship of the cells. Thus for example, if the cells form a 6×7, the device is able to load 42 rolls at one time, those rolls also being arranged in a 6×7 configuration. Thus the cargo compartment can be loaded evenly with the optimum number of bags without damaging the bags or their contents. Once the loading device is unloaded, the operation may be repeated with a second group of bags positioned adjacent to the first group, provided of course that the cargo compartment is long enough to hold a second group.

In order to facilitate the above-described operation, inner surfaces of the cells may be coated to reduce their coefficient of friction.

Normally, while the loading device is being maneuvered within the cargo compartment it does not get close to the side walls. However, if the device does get too close to the side walls, horizontal wheels 24 engage the side walls of the compartment thus facilitating the movement of the loading device and preventing any damage that may occur during the movement. Furthermore, an automatic tracking or guidance system may be provided to guide the device from the loading site into the compartment.

The loading device is shown in the figures with 40 cells, however it is clear that the number, size, shape configuration, and length of these walls can be changed as desired in accordance with the size and shape of the bags and the cargo compartment.

Furthermore, the method and device presented herein could be used for loading containers as well as trucks.

It is obvious to one skilled in the art that numerous modifications could be made to the present invention without departing from its scope as defined in the appended claims.

I claim:

1. A method of loading long objects into a truck compartment comprising:
    placing said objects into a device having plungers and corresponding tubular cells arranged in the cross-sectional shape of said compartment with said plungers being arranged and positioned to move in and out of said cells as said cells and plungers are moved with respect to each other;
    moving said device into said compartment horizontally and
    removing said objects from said cells without changing their relative spatial relationship by withdrawing said device from said compartment while said objects are maintained in a stacked configuration by said plungers.

2. The method of claim 1 wherein said objects comprise materials with a high loft.

3. The method of claim 2 wherein said objects are inserted in bags, the method further comprising removing air from said bags to reduce their volume prior to placing them into said cells.

4. The method of claim 3 wherein the air is removed by inserting a vacuum line through the bag into the material contained therein.

* * * * *